(12) United States Patent
Tomaselli et al.

(10) Patent No.: US 12,443,209 B2
(45) Date of Patent: Oct. 14, 2025

(54) PRESSURE REGULATOR

(71) Applicant: CAVAGNA GROUP S.P.A., Ponte S. Marco (IT)

(72) Inventors: Luigi Tomaselli, Ghedi (IT); Giuliano Cavagna, Brescia (IT)

(73) Assignee: CAVAGNA GROUP S.P.A., Ponte S. Marco (IT)

( * ) Notice: Subject to any disclaimer, the term of this patent is extended or adjusted under 35 U.S.C. 154(b) by 0 days.

(21) Appl. No.: 18/565,999

(22) PCT Filed: May 25, 2022

(86) PCT No.: PCT/IB2022/054877
§ 371 (c)(1),
(2) Date: Nov. 30, 2023

(87) PCT Pub. No.: WO2022/254287
PCT Pub. Date: Dec. 8, 2022

(65) Prior Publication Data
US 2024/0272655 A1    Aug. 15, 2024

(30) Foreign Application Priority Data

Jun. 3, 2021  (IT) .......................... 102021000014441

(51) Int. Cl.
*G05D 16/06* (2006.01)
(52) U.S. Cl.
CPC ................... *G05D 16/0661* (2013.01)
(58) Field of Classification Search
CPC ... G05D 16/0661; F16K 31/086; F16K 31/08; F16K 31/084
See application file for complete search history.

(56) References Cited

U.S. PATENT DOCUMENTS

| 2,869,563 A | 1/1959 | Schoengrun |
| 3,877,478 A * | 4/1975 | Longworth ............. F23N 1/087 137/87.03 |

(Continued)

FOREIGN PATENT DOCUMENTS

| DE | 2638879 A1 * | 3/1978 | |
| GB | 1237295 A * | 6/1971 | |
| WO | WO-2011054886 A1 * | 5/2011 | ............. F16K 31/02 |

OTHER PUBLICATIONS

Machine Translation of WO2011054886 retrieved from espacenet.com Feb. 5, 2025 (Year: 2025).*

(Continued)

*Primary Examiner* — Jessica Cahill
(74) *Attorney, Agent, or Firm* — Barnes & Thornburg (57) ABSTRACT

A pressure regulator for a gas comprising an outflow pipe for the gas, a movable closure member, a main body comprising a first chamber in fluid communication with the out flow pipe, a second chamber in atmospheric contact, a separation element which is movable inside the main body so as to define a movable separation wall between the first chamber and the second chamber and which is fixedly joined to the movable closure member, characterized in that the main body further comprises a first magnetic element which is arranged in the first chamber, a second magnetic element which is arranged in the second chamber, and a third magnetic element which is associated with the separation element and which has such a polarity as to be in a state of attraction with one of the first magnetic element and the second magnetic element and in a state of repulsion with the other.

17 Claims, 4 Drawing Sheets

(56) References Cited

U.S. PATENT DOCUMENTS

| | | | |
|---|---|---|---|
| 4,298,943 A | | 11/1981 | Tompson et al. |
| 4,501,290 A | | 2/1985 | Sturman et al. |
| 4,694,860 A | * | 9/1987 | Eidsmore ................ F16K 17/24 |
| | | | 251/76 |
| 4,705,070 A | * | 11/1987 | Eidsmore .............. F16K 31/086 |
| | | | 251/76 |
| 5,947,155 A | | 9/1999 | Miki et al. |
| 8,567,062 B2 | * | 10/2013 | Querejeta Andueza ..................... |
| | | | F16K 27/029 |
| | | | 29/890.125 |
| 2002/0143318 A1 | * | 10/2002 | Flinchbaugh ..... A61M 5/16881 |
| | | | 604/179 |
| 2006/0169935 A1 | * | 8/2006 | Yajima .................. F16K 31/086 |
| | | | 251/65 |
| 2020/0378523 A1 | * | 12/2020 | Ishikawa ............. F16K 31/1221 |

OTHER PUBLICATIONS

Search Report & Written Opinion issued in PCT/IB2022/054877 (Jul. 8, 2022)

* cited by examiner

PRESSURE REGULATOR

CROSS REFERENCE TO RELATED APPLICATIONS

This application is a U.S. nationalization under 35 U.S.C. § 371 of International Application No. PCT/IB2022/054877, filed 25 May 2022, which claims priority to Italian Patent Application No. 102021000014441, filed 3 Jun. 2021. The disclosures set forth in the referenced applications are incorporated herein by reference in their entireties.

TECHNICAL FIELD

The present invention relates to a pressure regulator for a gas which is mainly intended for domestic use, having the features set out in the preamble of the main claim. The present invention further relates to a regulation method for the pressure regulator mentioned above.

TECHNOLOGICAL BACKGROUND

A pressure regulator of the known type typically comprises an outflow pipe for a gas, having an end which communicates with the branch upstream of the regulator and another end which communicates with the branch downstream of the same regulator.

There is provided in the outflow pipe a closure member which brings about a throttling in the outflow pipe itself so as to cause a pressure reduction of the gas between an upstream and downstream position of the closure member itself. The closure member is movable in such a manner that the passage section and consequently the pressure of the gas can be modified as a function of the flow rate of the gas itself.

The movement of the closure member is assigned to a feedback circuit which, in the presence of a pressure increase of the gas with respect to the value to which the regulator is adjusted, the calibration pressure, reduces the degree of opening of the closure member, the opposite being carried out in the case of a pressure reduction.

The above-mentioned feedback is based on the use of a member which comprises two chambers which are separated by a movable separation element, typically a membrane or a piston, which is connected to the closure member and which is associated with a spring. Typically, one of the two chambers is connected in fluid terms to an outflow pipe. As long as the pressure in this chamber is in equilibrium with the force of the spring, the separation element remains fixed.

This chamber is also defined as a movement chamber.

In the presence of a pressure variation, the separation element is moved, causing a corresponding movement of the closure member until the calibration pressure is re-established.

According to a first piece of prior art, the movement chamber is placed directly in fluid communication with the outflow pipe in a section downstream of the closure member in such a manner that the movable separation element is subjected to the supply pressure of the gas.

The movable separation element is connected to the closure member in such a manner that an increase in the supply pressure, for example, following a reduction of the flow rate thereof, causes a closure of the closure member so as to re-establish the initial pressure of equilibrium.

The regulator which is described above is called a "direct action" regulator because the movable wall which controls the closure member is directly subjected to the supply pressure of the gas. In this case, the calibration pressure is regulated by acting on the preloading of the spring.

A pressure regulator with direct action has a high level of rapidity of response to the variations in pressure because the delay is only the one linked to the mechanical inertia and the occurrences of wear of the components of the regulator and the time necessary for propagating the pressure variation from the outflow pipe to the movement chamber.

However, the above-mentioned direct-action regulator has a relatively limited regulation accuracy as a result of the fact that the force of the spring is not uniform during variations of the deformation thereof.

In particular, during increases in the compression, the resilient force of the spring increases while it decreases during reductions in the compression itself.

Consequently, the pressure of the gas necessary for balancing the force of the spring depends on the deformation thereof and therefore on the position of the movable separation element.

Therefore, the supply pressure of the gas is not constantly equal to the calibration pressure but deviates therefrom as a function of the position of the closure member.

Some of these pressure regulators allow a variation of the calibration pressure in a limited manner by acting on a regulation screw or equivalent system which modifies the degree of deformation of the spring itself so as to vary the force applied thereby for the same position of the closure member. This variation is in any case of a very limited size.

The above-mentioned pressure regulators with direct action therefore have the additional disadvantage of not allowing a significant modification of the calibration pressure without redesigning the spring and most often the entire pressure regulator which receives this spring.

Another disadvantage of these regulation systems is that they have a high level of propagation of the aerodynamic noise, which transmission is brought about via the structure-borne route by the spring itself.

A second piece of prior art for controlling the pressure regulator provides for indirect feedback by means of a pilot device, which varies the pressure in the movement chamber in such a manner that the supply pressure of the gas is maintained at the regulation value imposed in the pilot device.

With respect to the regulation system with direct action, the feedback system has the advantage of allowing more precise regulation of the supply pressure of the gas. However, the pressure regulation system with feedback has the disadvantage of having a response time greater than that of the first system, given that it also comprises the reaction times of the pilot device.

Another disadvantage of the system described above is the fact that a malfunction of the pilot device makes it impossible to regulate the supply pressure of the gas, limiting the reliability of the regulation system.

DESCRIPTION OF THE INVENTION

An object of the present invention is to overcome all the disadvantages mentioned above belonging to the pressure regulation systems of the known type.

In particular, an object of the present invention is to provide a pressure regulator which combines the advantages of a direct-action regulator with those of a piloted regulator.

These disadvantages are overcome and these objects are achieved by the present invention by means of a pressure regulator according to the appended claims.

In a first aspect thereof, therefore, the present invention is directed towards a pressure regulator for a gas, comprising
an outflow pipe for the gas;
a movable closure member for opening and closing the outflow pipe in a passage section thereof;
a main body comprising:
a first chamber in fluid communication with the outflow pipe,
a second chamber in atmospheric contact,
a separation element,
the first chamber and second chamber being defined in the main body and being separated by the separation element, the separation element being movable inside the main body so as to define a movable separation wall between the first chamber and the second chamber and being fixedly joined to the movable closure member,
characterized in that the main body further comprises:
a first magnetic element which is arranged in the first chamber,
a second magnetic element which is arranged in the second chamber, and
a third magnetic element which is associated with the separation element and which has such a polarity as to be in a state of attraction with one of the first magnetic element and the second magnetic element and in a state of repulsion with the other of the first magnetic element and the second magnetic element.

This allows the provision of a pressure regulator which is regulated by a total magnetic force which is the result of two magnetic fields, one attraction field and one repulsion field, so as to apply to the movable separation element a predefined force which acts counter to the action of the pressure of the gas present in the first chamber, balancing it at a calibration pressure.

Therefore, this pressure regulator has a calibration pressure which is regulated by two magnetic fields, one attraction field and one repulsion field, and not by means of a system which is only repulsive, such as the one in a conventional pressure regulator with a spring.

As long as the pressure of the first chamber is in equilibrium with the total magnetic force given by the two above-mentioned magnetic fields, the movable wall remains fixed, in a similar manner to what happens for a pressure regulator with a spring, wherein the movable wall remains fixed as long as the pressure of the first chamber is in equilibrium with the force of the spring itself.

Advantageously, this pressure regulator acts with force which is almost constant around the calibration pressure, unlike the spring type regulators in which the spring, as set out, as a function of the elongation or contraction thereof, varies the resilient force thereof.

Another advantage of the present pressure regulator is that it has a structure-borne acoustic propagation which is greatly reduced with respect to conventional spring type pressure regulators.

Advantageously, furthermore, the central magnet will move under a force which is virtually constant around the position of equilibrium, corresponding to the calibration pressure, while, by moving closer to one of the two ends, it will be subjected to a force which is correspondingly higher; in particular, it will be subjected to a repulsive force which increases exponentially when it moves towards the magnet with polar conformity and an attractive force which decreases exponentially when it moves away from the magnet with polar non-conformity, and vice versa.

Therefore, the valve will be able to ensure optimum performance levels even in situations in which an overboost is required, that is to say, a high flow rate of the gas, and a cut-off, that is to say, when it is necessary to drastically reduce it.

In fact, the conventional valves such as the ones with springs normally have an overboost pressure which chokes the pressure regulator, that is to say, in the case of overboost, when it is necessary to have a peak of the instantaneous power of the pressure regulator, in reality it is under the most unfavourable conditions because the resilient force of the spring at this point is substantially reduced.

With the pressure regulator of the present invention, however, there is a system which can be adjusted appropriately and which is able to achieve an imbalance of forces which is counter to the resilient equilibrium of a spring.

In a second aspect thereof, the present invention relates to a regulation method for such a pressure regulator, characterized by varying the calibration pressure and/or the overboost pressure and/or the cut-off pressure by varying the flux of the magnetic field intercepted by the third magnetic element.

This advantageously allows a variation in the total magnetic force to which the third magnetic element is subjected which is the result between the attraction force with respect to one of the first and second magnetic elements and the repulsion force with respect to the other of the first and second magnetic elements, ensuring for the pressure regulator a great flexibility for setting the calibration pressure and the performance levels in overboost and in cut-off.

In the present description, as in the claims appended thereto, some terms and expressions are considered to take on, unless explicitly indicated otherwise, the meaning expressed in the following definitions.

Preferably, the movable closure member is arranged along the outflow pipe so as to define this section variation in the outflow pipe which is able to cause a pressure variation of the gas from an adduction pressure which is present in a first zone of the outflow pipe upstream of the closure member with respect to the outflow direction of the gas to a supply pressure which is present in a second zone of the outflow pipe downstream of the closure member.

Preferably, the first chamber is in fluid communication with the outflow pipe downstream of the movable closure member.

Preferably, the separation element is fixedly joined to the movable closure member in such a manner that the increase in the supply pressure brings about a movement of the movable separation wall and correspondingly a movement of the closure member which is able to reduce the passage section, and vice versa.

Preferably, the third magnetic element is interposed between the first and second magnetic elements.

Preferably, such magnetic elements have a magnetic axis which is arranged along an axis X.

Advantageously, this allows the maximum efficiency of the magnetic elements to be achieved, further involving a general equilibrium between the magnetic elements and therefore of the pressure regulation system overall, the result of the magnetic forces also being directed along the axis X.

Preferably, the third magnetic element is movable between the first and second magnetic elements along the axis X.

This advantageously allows maximum exploitation of the variation of the total magnetic force which acts on the third magnetic element and which is the result of the attractive force towards one of the first and second magnetic elements and the repulsive force towards the other of the first and second magnetic elements.

Preferably, the movable closure member is capable of moving along the axis X for opening and closing the outflow pipe in the passage section thereof.

In some preferred embodiments, the third magnetic element and the movable closure member are both located along the axis X.

This advantageously allows a functionally simple construction of the pressure regulator.

In some embodiments, one or more of the first magnetic element, second magnetic element and third magnetic element comprise one or more magnet(s) This advantageously allows a great flexibility of construction of these magnetic elements and the magnetic field of each of them.

Preferably, when one or more of these first magnetic element, second magnetic element and third magnetic element comprise a single magnet, it is in the form of a rotational solid with a rotation axis which coincides with the axis X, more preferably it is of cylindrical or toroidal shape.

This allows the provision of a homogeneous spatial arrangement with respect to the axis X of the flux lines of the magnetic field of the magnetic element.

Preferably, when one or more of these first magnetic element, second magnetic element and third magnetic element comprise a plurality of magnets, they have a plurality of receiving members in which these magnets can be received.

This allows a variation in the magnetic force of each magnetic element without having to redesign the regulator or replacing the magnetic element but simply by increasing or decreasing the number of magnets received therein.

The term "magnets" is intended to be understood to mean all those elements capable of generating a magnetic field, whether they are permanent magnets, such as, for example, ferromagnetic materials, such as ferrites and neodymium magnets, or temporary magnets, such as electromagnets.

Preferably, these one or more magnets is/are permanent magnets.

This advantageously allows the operation of the pressure regulator without any need for a power supply source, whether it is internal or external with respect to the regulator.

When one or more of these magnets is/are electromagnets, the pressure regulator also comprises electrical power supply means and/or is able to receive an electrical power supply.

Preferably, these magnets are arranged in each of these one or more magnetic elements symmetrically about the axis X.

This allows the provision of a homogeneous spatial arrangement with respect to the axis X of the flux lines of the magnetic field of the magnets in the single magnetic element.

Preferably, the magnets in each of these one or more magnetic elements have a polarity which is orientated in the same direction and parallel with the axis X.

This allows minimization of the number and the magnetic force of the magnets in order to obtain a specific type of response of the pressure regulator and prevents disequilibriums of forces of the regulation system overall which could become generated with an orientation which is not in the same direction as the dipoles of the magnets in a magnetic element.

In some embodiments, the relative distance between the first magnetic element, second magnetic element and third magnetic element along the axis X is variable.

This advantageously allows the provision of a pressure regulator, in which it is possible to regulate the equilibrium pressure, that is to say, the calibration pressure, while continuing to have a zone around the equilibrium pressure with force which is virtually constant and the response force of the pressure regulator in situations in which performance levels of overboost and cut-off are required.

In fact, by regulating the equilibrium position of the third magnetic element, that is to say, the position around which the calibration pressure is operated, into a position which is not equidistant with respect to the first and second magnetic elements, there is generated a disequilibrium of forces which allows the behaviour of the pressure regulator to be regulated in the overboost and cut-off situations.

For example, under overboost conditions, with a pressure regulator which is normally open, regulating the equilibrium position of the third magnetic element close to the first magnetic element, with which it is in a state of attraction, increases the resilient force which tends to bring the regulator into an open position.

In fact, though the progression which is typically of the hyperbolic type of the attractive magnetic force between opposite poles seems practically identical in terms of absolute value to the progression of the repulsive magnetic force between poles of the same sign, in reality the attractive magnetic force is slightly greater, as an absolute value, than the repulsive force, particularly when reducing the spacing. Particularly when two identical magnets touch each other, the attraction between two opposite poles is approximately from 5% to 10% more powerful than the repulsion between identical poles.

This is because a traction magnet always has a force which is slightly greater than a repulsive force as an absolute value.

This means that with distances which are not symmetrical between the three magnetic elements, and particularly if there is a regulation equilibrium which involves the third magnetic element being closer to the magnetic element in terms of attraction, the force which acts on the closure member increases, which is the opposite of what occurs with a conventional spring type pressure regulator.

In this case, therefore, under overboost conditions, there is a higher equivalent pressure which serves to compensate for the increase in losses of charge which are present as a result of the increase in the flow rate, which there is being discharged, of the flow regulator.

In a conventional pressure regulator, however, when the flow rate being discharged out of the regulator is increased, the regulation pressure, that is to say, the pressure in the movement chamber, is always further away from the real pressure which arrives at the user because from the regulation section to the user there is a pipe section which is not zero and consequently there are charge losses which are associated with this section.

Preferably, the position of at least one of the first magnetic element and the second magnetic element along the axis X is variable.

This allows regulation of the calibration pressure, continuing to have a zone around the equilibrium pressure with virtually constant force, and the response force of the pressure regulator in overboost and cut-off situations.

Preferably, the position of the third magnetic element along the axis X is variable.

In this case, this also allows regulation of the calibration pressure and the response force of the pressure regulator in overboost and cut-off situations.

In some embodiments, the relative distance between the magnetic elements is adjustable by means of regulation elements.

This allows a regulation of the relative distance between the magnetic elements in a simple and efficient manner.

Preferably, these regulation elements are threaded connections, more preferably threaded connections with micrometric threading.

This allows a fine regulation of the relative distance between the magnetic elements and consequently of the magnetic force to which the third magnetic element is subjected in any of the positions thereof between the first and second magnetic elements.

Preferably, the separation element is a membrane or a piston.

In one embodiment, the arrangement and the polarity of the first magnetic element, second magnetic element and third magnetic element are such that the pressure regulator is normally open.

The calibration pressure and/or the overboost pressure and/or the cut-off pressure of this pressure regulator can be varied by varying the flux of the magnetic field which is intercepted by the third magnetic element, particularly by varying the attraction force of the third magnetic element with one of the first and second magnetic elements and leaving unchanged the repulsion force of the third magnetic element with respect to the other of the first and second magnetic elements, by varying the repulsion force of the third magnetic element with one of the first and second magnetic elements and leaving unchanged the attraction force with respect to the other of the first and second magnetic elements, or by varying both these attraction and repulsion forces.

Preferably, the calibration pressure and/or the overboost pressure and/or the cut-off pressure can be varied by varying the relative distance between the first magnetic element, the second magnetic element and the third magnetic element and/or the magnetic force of one or more of these magnetic elements.

This allows regulation of the force which is used to move the closure member in a simple manner by means of the regulation elements and/or by acting on the magnetic elements, for example, by varying the number of magnets of one or more of the magnetic elements or the geometry of one or more of the magnetic elements.

Preferably, the calibration pressure and/or the overboost pressure and/or the cut-off pressure are varied by varying the position of at least one of the first magnetic element and second magnetic element and/or third magnetic element.

This allows modification of the calibration pressure and/or the overboost pressure and/or the cut-off pressure of the pressure regulator in a simple manner without having to replace the elements or having to completely redesign the regulator itself, as may occur in the case of a spring type pressure regulator.

In one embodiment, the calibration pressure and/or the overboost pressure and/or the cut-off pressure are varied by varying the number of magnets of one or more of the magnetic elements or the geometry of one or more of the magnetic elements.

This also allows modification of the calibration pressure and/or the overboost pressure and/or the cut-off pressure of the pressure regulator in a simple manner without having to completely redesign it, as may occur in the case of a spring type pressure regulator.

The features and advantages of the invention will be better appreciated below from the detailed description of a number of preferred embodiments thereof, which are illustrated by way of non-limiting example with reference to the appended drawings, in which.

As known, the magnetic force between two magnets is of the attractive type between poles with the opposite sign and of the repulsive type between poles with the same sign.

Figure 1:
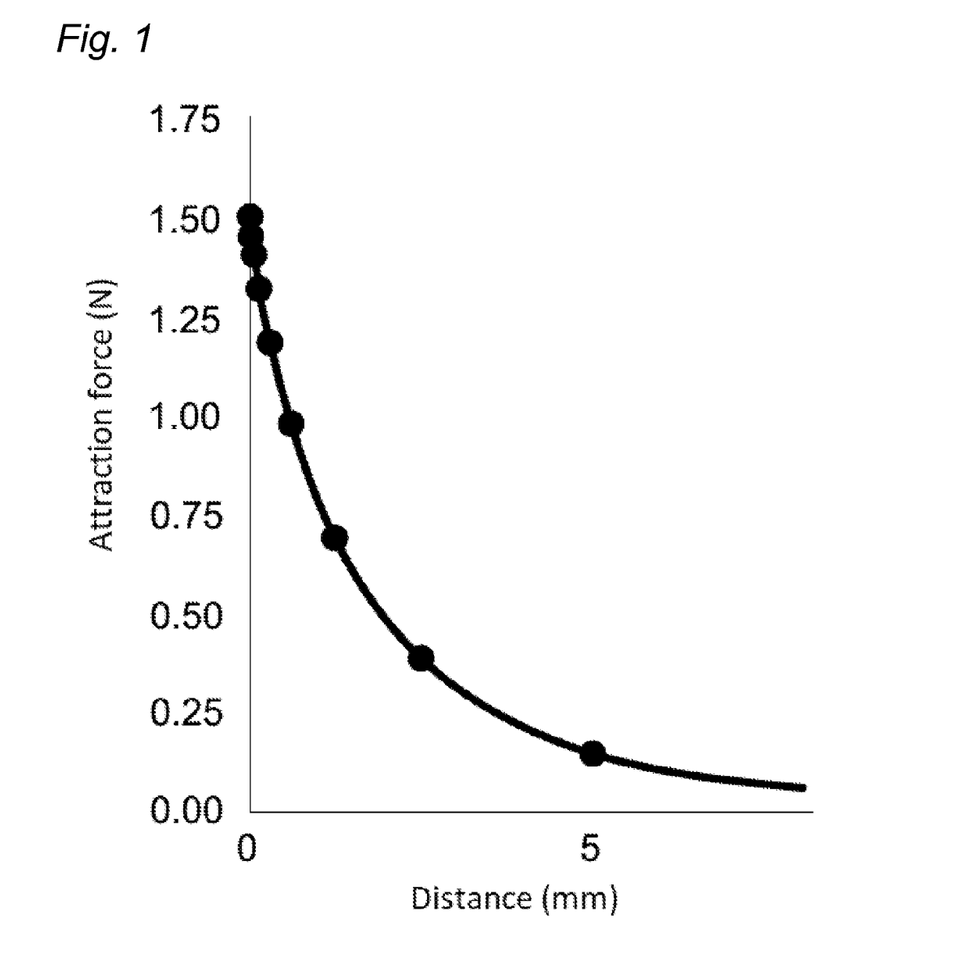
FIG. 1 is an exemplary and non-limiting graph of the magnetic force as a function of the distance between two magnets.

With reference to the appended Figures, FIG. 1 depicts the experimentally formed progression of the attractive magnetic force between opposite poles of two identical magnets during variation of the distance; as will be seen, this progression is typically of the hyperbolic type.

The magnetic force is of the repulsive type between two identical poles, but has the same type of hyperbolic progression even if the attractive magnetic force is slightly greater, as an absolute value, than the repulsive force, particularly when decreasing the distance.

Therefore, a magnet which is interposed between two other mutually identical magnets and which is attracted to one of them, with which it is therefore in polar non-conformity, and which is repulsed by the other one, with which it is therefore in polar conformity, is subjected to a force which is the result between the attractive force of the hyperbolic type with the first magnet and the repulsive force of the hyperbolic type with the second magnet. The result is that the central magnet is subjected to a total magnetic force, which can be defined as a movement force and which has a virtually linear progression as a function of the position thereof between the two magnets themselves.

Thus, when the central magnet is equidistant from the other two magnets, it will be subjected to an attraction force with a specific value towards one magnet, the one with which it has polar non-conformity, and a repulsion force with a specific value towards the other magnet, the one with which it has polar conformity. In a position near the magnet with polar conformity and remote from the magnet with polar non-conformity, the movement force to which the central magnet is subjected will be the result of a high repulsion force and a low attraction force; vice versa, in a position near the magnet with polar non-conformity and remote from the magnet with polar conformity, the movement force to which the central magnet is subjected will be the result of a high attraction force and a low repulsion force.

Therefore, it is possible to use this behaviour in order to construct a flux regulator which operates at constant force around the calibration pressure.

This progression of the force has been demonstrated with a dynamometer which is provided with a magnetic design which is equivalent to the one described below. This progression of forces represents a non-limiting example of the magnetic equilibriums which can be achieved with the present pressure regulator.

The data are indicated in Table 1 set out below; in particular, there are indicated the data of the force, expressed in Newton, to which the third magnetic element is subjected during variation of the distance thereof from the first magnetic element, with a distance between the first magnetic element and the second magnetic element which is 10 mm (column A), 9 mm (column B), 6 mm (column C), 5 mm (column D) and 3 mm (column E), respectively.

TABLE 1

| Distance between first and third magnetic element [mm] | Force [N] | | | | |
|---|---|---|---|---|---|
| | A | B | C | D | E |
| 0 | 0 | 0 | 0 | 0 | 0 |
| 0.5 | 49.0 | 53.7 | 54.1 | 56.7 | 61.6 |
| 1 | 42.6 | 45.3 | 47.2 | 50.5 | 54.9 |
| 1.5 | 38.5 | 40.9 | 41.5 | 45.6 | 52.4 |
| 2 | 34.6 | 37.0 | 39.0 | 42.6 | 51.7 |
| 2.5 | 32.7 | 34.8 | 37.0 | 41.2 | 53.2 |
| 3 | 31.1 | 32.8 | 34.9 | 40.9 | 57.5 |
| 3.5 | 29.8 | 31.4 | 35.8 | 41.9 | — |
| 4 | 29.0 | 31.0 | 33.8 | 43.6 | — |
| 4.5 | 28.4 | 30.2 | 34.8 | 46.4 | — |
| 5 | 28.9 | 30.7 | 35.4 | 51.6 | — |
| 5.5 | 28.6 | 30.7 | 37.2 | — | — |
| 6 | 30.1 | 29.8 | 40.4 | — | — |
| 6.5 | 30.6 | 31.8 | — | — | — |
| 7 | 30.4 | 33.2 | — | — | — |
| 7.5 | 31.3 | 35.5 | — | — | — |
| 8 | 32.3 | 38.9 | — | — | — |
| 8.5 | 34.4 | 42.6 | — | — | — |
| 9 | 37.8 | 48.4 | — | — | — |
| 9.5 | 42.0 | — | — | — | — |
| 10 | 48.2 | — | — | — | — |

As may be noted, for any distance between the first and second magnets, the third magnet is subjected, in an intermediate zone between the two, to a force which remains constant for small movements around the intermediate position, but then increasing at the ends, that is to say, when it approaches the first magnetic element, with which it is in a state of attraction, or the second magnetic element, with which it is in a state of repulsion.

The possibility of varying the distance between the three magnetic elements therefore allows the provision of a pressure regulator which is completely regulable in the entire operating range thereof, while controlling not only the calibration pressure thereof, but also the performance levels thereof under overboost and cut-off conditions.

Figure 2:
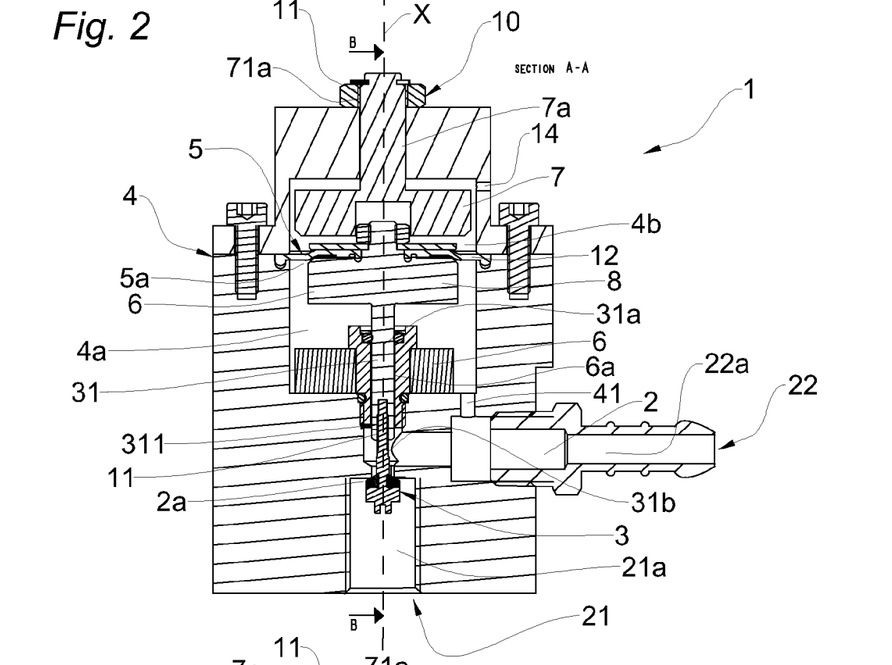
FIG. 2 is a schematic sectional view along a plane of section A-A of a pressure regulator according to a first embodiment according to the present invention.
Figure 3:
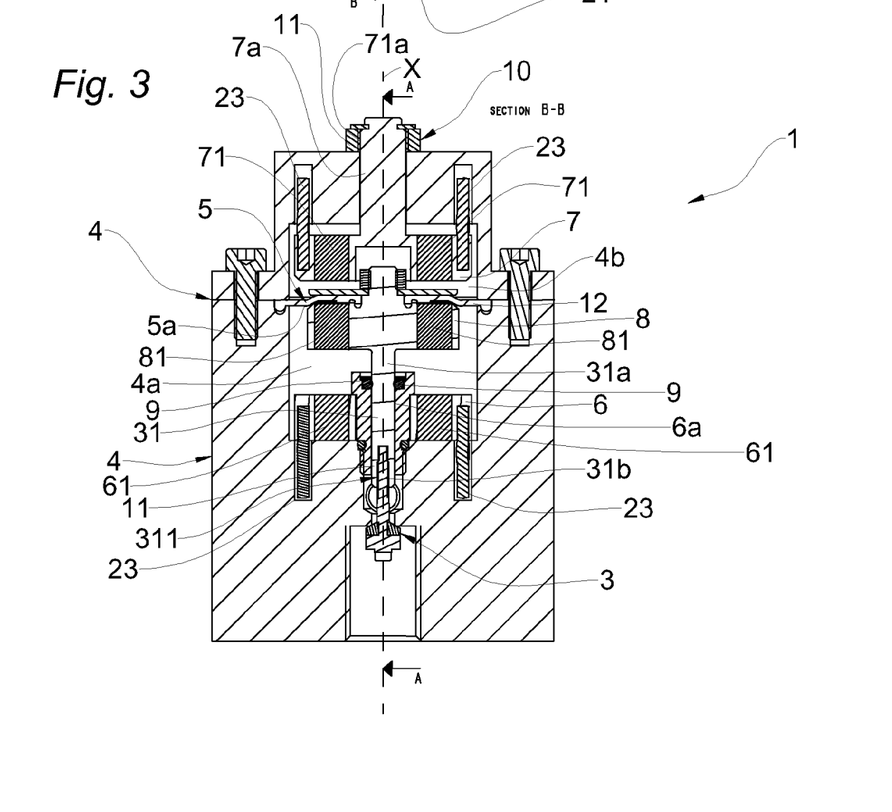
FIG. 3 is a schematic sectional view along a plane of section B-B of the pressure regulator of FIG. 2.

In FIG. 2, there is generally indicated a pressure regulator 1 according to the present invention in cross-section taken along a plane of section A-A and in FIG. 3 the same pressure regulator 1 is shown in cross-section taken along a plane of section B-B.

With reference to FIG. 2, the pressure regulator 1 comprises an outflow pipe 2 for the passage of the gas which develops between an inlet opening 21 and an outlet opening 22. Therefore, the gas enters the outflow pipe 2 of the pressure regulator 1 from the inlet opening 21 and is discharged from the outlet opening 22, thereby defining an outflow direction which extends from the inlet opening 211 to the outlet opening 22.

The pressure regulator 1 further comprises a movable closure member 3 which is arranged along the outflow pipe 2 for opening and closing the outflow pipe 2 in a passage section 2a thereof. When the movable closure member 3 varies the passage section 2a, it causes a pressure variation of the gas from an adduction pressure, which is present in a first zone 21a of the outflow pipe 2 upstream of the movable closure member 3 with respect to the outflow direction of the gas, to a supply pressure, which is present in a second zone 22a of the outflow pipe 2 downstream of the movable closure member 3.

Particularly when the movable closure member 3 engages with the outflow pipe 2, it reduces the passage section 2a until it makes it equal to zero and therefore until it interrupts the flow of the gas, while, when it disengages from the outflow pipe 2, it increases the passage section 2a up to a maximum which is given by the geometry of the system and in particular the geometry of the outflow pipe 2 itself.

FIGS. 2 and 3 illustrate the pressure regulator 1 in the closure condition thereof, that is to say, the movable closure member 3 completely engages the passage section 2a, preventing the fluid communication between the first zone 21a and second zone 22a of the outflow pipe 2.

The regulator has a main body 4 which comprises a first chamber 4a in fluid communication with the pipe 2 downstream of the movable closure member 3 through the channel 41, a second chamber 4b in atmospheric communication by means of the opening 14 and a separation element 5. In particular, the first chamber 4a and the second chamber 4b are defined in the main body 4 and are separated by the separation element 5.

With reference to FIGS. 2 and 3, therefore, the first chamber 4a is the movement chamber.

With reference to FIGS. 2 and 3, this separation element 5 is a membrane 12.

The separation element 5 is movable along an axis X so as to define a movable separation wall 5a between the first chamber 4a and the second chamber 4b which is securely attached to the movable closure member 3 by means of a rod 31 in such a manner that the increase of the supply pressure of the gas, for example, following a reduction of the flow rate required downstream of the pressure regulator 1, brings about a movement of the movable separation wall 5a and consequently of the separation element 5, and accordingly a movement of the movable closure member 3 so as to reduce the passage section 2a. Accordingly, a reduction of the supply pressure of the gas brings about a movement of the movable separation wall 5a and consequently of the separation element 5, and accordingly a movement of the movable closure member 3 so as to increase the passage section 2a.

The rod 31 is constituted by a first portion 31a which is secured to the separation element 5 and by a second portion 31b which is secured to the movable closure member 3. The first portion 31a and second portion 31b have a threaded connection 311 which allows regulation of the distance between the movable separation wall 5a and the movable closure member 3.

The main body 4 further comprises a first magnetic element 6 which is arranged in the first chamber 4a, a second magnetic element 7 which is arranged in the second chamber 4b, and a third magnetic element 8 which is interposed between the first magnetic element 6 and the second magnetic element 7.

The third magnetic element 8 is fixedly joined to the separation element 5 and the movable closure member 3 to which it is connected by means of the rod 31.

The first magnetic element 6 has a through-channel 6a which is of cylindrical form and which develops along the axis X. The rod 31 has a length which is greater than the length of the through-channel 6a in such a manner that the separation element 5 and the movable closure member 3 are located along the axis X at opposite sides of the first magnetic element 6.

The rod 31 is slidingly received in this through-channel 6a; the rod 31 is therefore able to slide in this through-channel 6a following the movement of the movable separation wall 5a.

Suitable resilient sealing elements 9, for example, O-rings, ensure that there is complete fluid-tightness between the rod 31 and the through-channel 6a of the first magnetic element 6 so that there is no passage of gas between the two.

Each of the three magnetic elements 6, 7, 8 comprises at least one magnet. With particular reference to FIG. 3, the first magnetic element 6 comprises a first plurality of magnets 61, the second magnetic element 7 comprises a second plurality of magnets 71 and the third magnetic element comprises a third plurality of magnets 81.

Each plurality of magnets 61, 71 and 81 has an arrangement in the respective magnetic element 6, 7, 8 which is symmetrical with respect to the axis X and has such a polarity that the third magnetic element 8 is in a state of attraction with the first magnetic element 6 and in a state of repulsion with the second magnetic element 7. This allows the pressure regulator 1 to be normally open, that is to say, to have the passage section 2a normally open, that is to say, not engaged, or engaged only partially, by the movable closure member 3.

The relative distance between the magnetic elements 6, 7, 8 along the axis X is adjustable.

In particular, the first magnetic element 6 is fixed inside the main body 4 and the second magnetic element 7 and the third magnetic element 8 have positions along the axis X which can be regulated.

With reference to FIG. 3, the first magnetic element 6 and the second magnetic element 7 are further secured to the main body 4 by means of anti-rotation elements 23 so as to prevent the rotation of the magnetic elements 6 and 7 about the axis X.

The position of the third magnetic element 8 along the axis X is regulable by means of the threaded connection 311; in particular, unscrewing the threaded connection 311 extends the rod 31, moving the separation element 5 away from the movable closure member 3, and involves a movement of the third magnetic element 8 away from the first magnetic element 6 and a movement towards the second magnetic element 7 and, vice versa, screwing the threaded connection 311 shortens the rod 31, moving the movable separation element 5 and the movable closure member 3 closer, and involves a movement of the third magnetic element 8 towards the first magnetic element 6 and a movement away from the second magnetic element 7.

The position of the second magnetic element 7 along the axis X is regulable by means of a bush 10 which is positioned outside the second chamber 4b. In detail, the second magnetic element 7 has an elongate portion 7a which develops along the axis X outside the second chamber 4b. This elongate portion 7a has a micrometric thread 71a and the bush 10 is able to be screwed on the micrometric thread 71a in such a manner that screwing the bush 10 on the micrometric thread 71a produces a movement of the second magnetic element 7 away from the third magnetic element 8 and unscrewing the bush 10 produces a movement of the second magnetic element 7 towards the third magnetic element 8.

The bush 10 is accessible from the exterior of the main body 4.

Figure 4:
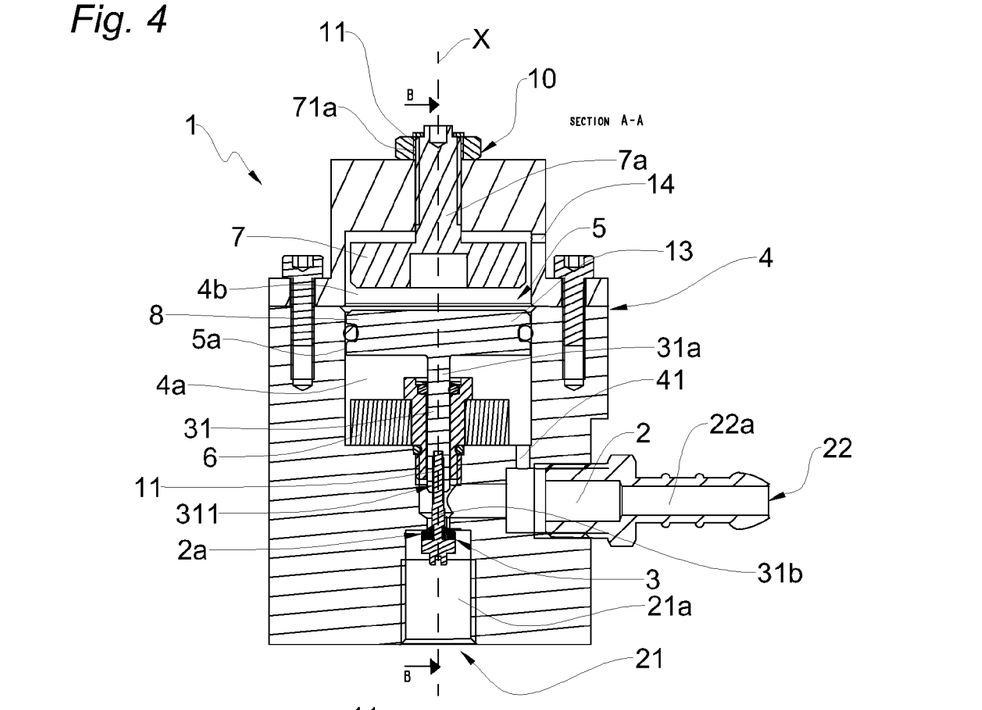
FIG. 4 is a schematic sectional view along a plane of section A-A of a pressure regulator according to a second embodiment according to the present invention.
Figure 5:
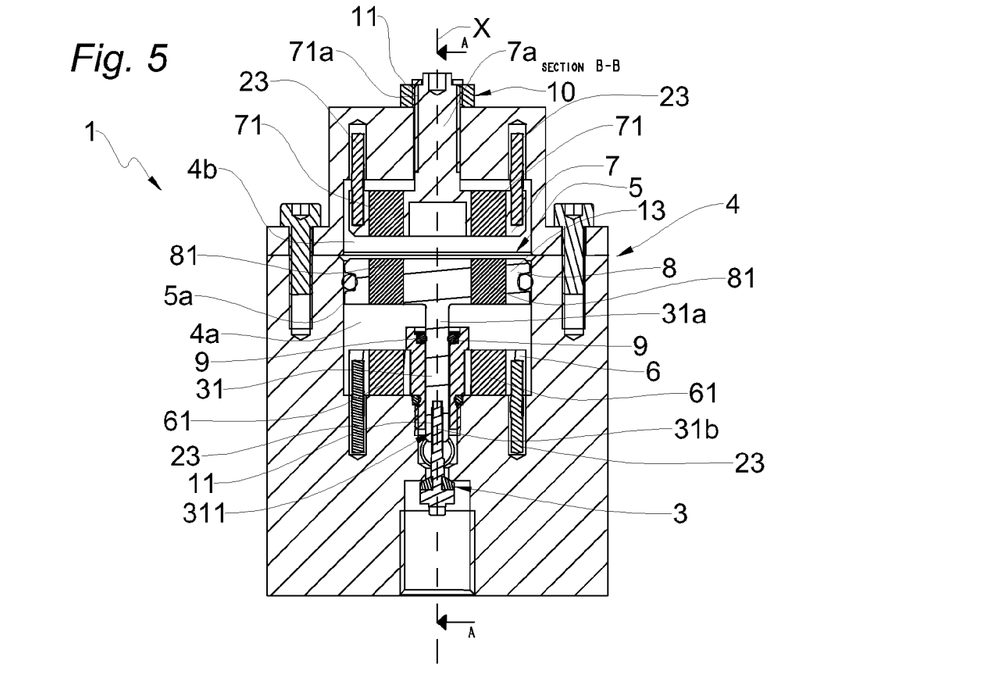
FIG. 5 is a schematic sectional view along a plane of section B-B of the pressure regulator of FIG. 4.

FIGS. 4 and 5 depict a pressure regulator according to a second embodiment in cross-section taken along a plane of section A-A and along a plane of section B-B, respectively.

In this embodiment, all the elements are the same as the first embodiment of FIGS. 2 and 3 described above; the only different element is in fact constituted in that the separation element 5 is a piston 13 which is movable along an axis X so as to define a movable separation wall 5a between the first chamber 4a and the second chamber 4b. In this case, the piston 13 is also securely attached to the movable closure member 3 by means of a rod 31 in such a manner that the increase of the supply pressure of the gas brings about a movement of the movable separation wall 5a and consequently of the piston 13 and accordingly a movement of the movable closure member 3 so as to reduce the passage section 2a. Accordingly, a reduction of the supply pressure of the gas brings about a movement of the movable separation wall 5a and consequently of the piston 13 and accordingly a movement of the movable closure member 3 so as to increase the passage section 2a.

Also in this embodiment, the rod 31 is constituted by a first portion 31a which is secured to the piston 13 and by a second portion 31b which is secured to the movable closure member 3. The first portion 31a and second portion 31b have a threaded connection 311 which allows regulation of the distance between the movable separation wall 5a and the movable closure member 3.

The third magnetic element 8 is fixedly joined to the piston 13 and the movable closure member 3 to which it is connected by means of the rod 31.

In this embodiment, the position of the third magnetic element 8 along the axis X is also regulable by means of the threaded connection 311; in particular, unscrewing the threaded connection 311 extends the rod 31, moving the piston 13 away from the movable closure member 3, and involves a movement of the third magnetic element 8 away from the first magnetic element 6 and a movement towards the second magnetic element 7 and, vice versa, screwing the threaded connection 311 shortens the rod 31, moving the piston 13 and the movable closure member 3 closer, and involves a movement of the third magnetic element 8 towards the first magnetic element 6 and a movement away from the second magnetic element 7.

The position of the second magnetic element 7 along the axis X is regulable with the same mechanism as the first embodiment of FIGS. 2 and 3 described above.

Figure 6:
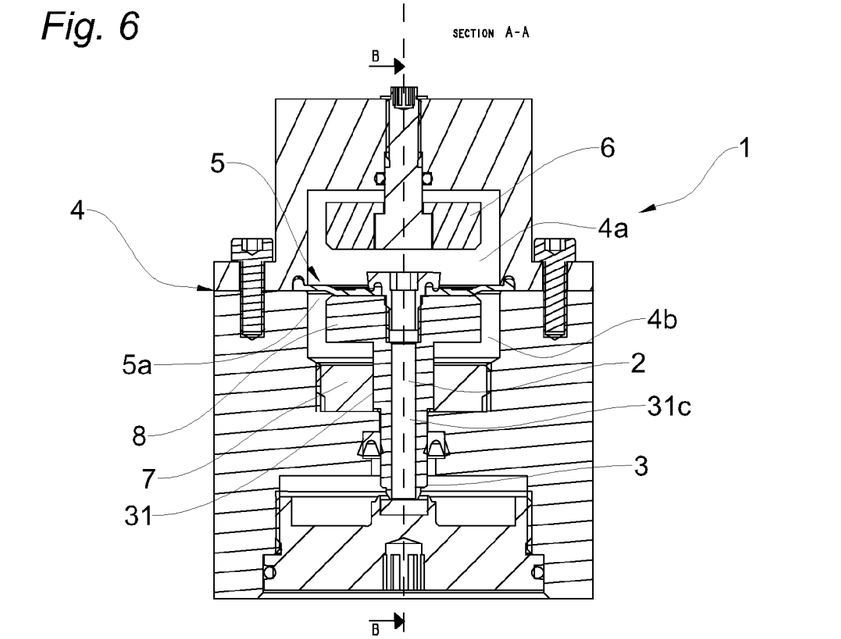
FIG. 6 is a schematic sectional view along a plane of section A-A of a pressure regulator according to a third embodiment according to the present invention.
Figure 7:
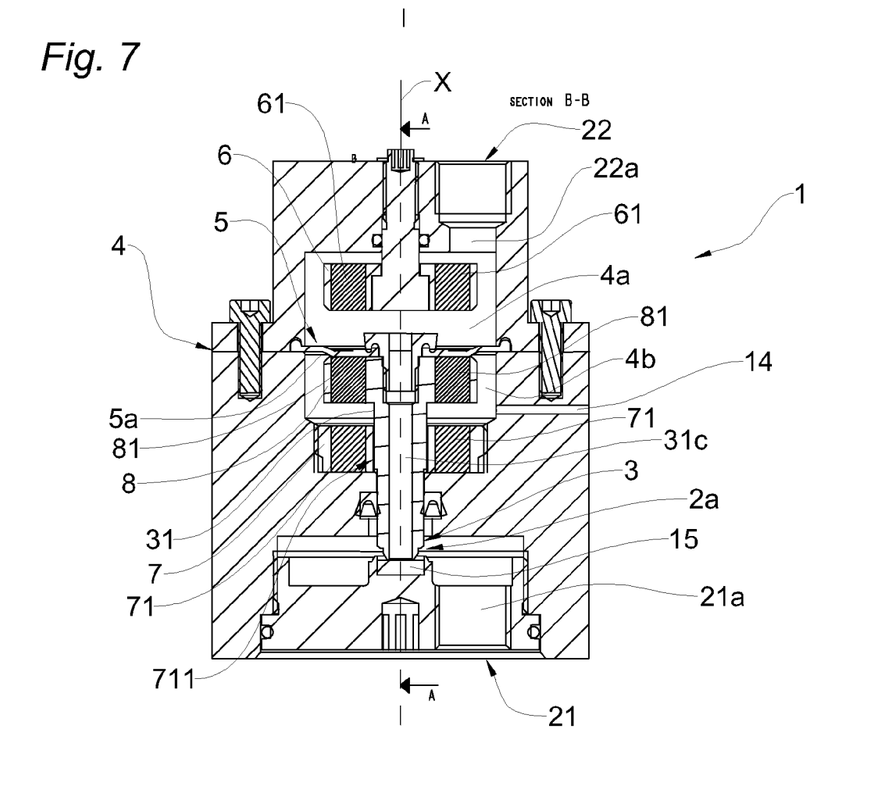
FIG. 7 is a schematic sectional view along a plane of section B-B of the pressure regulator of FIG. 6.

FIGS. 6 and 7 depict a pressure regulator according to a third embodiment in cross-section taken along a plane of section A-A and along a plane of section B-B, respectively.

Also in this embodiment, the pressure regulator 1 comprises an outflow pipe 2 for the passage of the gas which develops between an inlet opening 21 and an outlet opening 22, as can be seen in FIG. 7. Therefore, the gas enters the outflow pipe 2 of the pressure regulator 1 from the inlet opening 21 and is discharged from the outlet opening 22, thereby defining an outflow direction which extends from the inlet opening 211 to the outlet opening 22.

The pressure regulator 1 further comprises a movable closure member 3 which is arranged along the outflow pipe 2 for opening and closing the outflow pipe 2 in a passage section 2a thereof.

When the movable closure member 3 varies the passage section 2a, it causes a pressure variation of the gas from an adduction pressure, which is present in a first zone 21a of the outflow pipe 2 upstream of the movable closure member 3 with respect to the outflow direction of the gas, to a supply pressure, which is present in a second zone 22a of the outflow pipe 2 downstream of the movable closure member 3.

In FIGS. 6 and 7, the pressure regulator 1 is illustrated in the closure condition thereof, that is to say, the movable closure member 3 completely engages the passage section 2a, moving into abutment against a tablet-like sealing member 15 which is arranged along the outflow pipe 2 and preventing the fluid communication between the first zone 21a and the second zone 22a of the outflow pipe 2.

Also in this embodiment, the regulator has a main body 4 which comprises a first chamber 4a in fluid communication with the pipe 2 downstream of the movable closure member 3, a second chamber 4b in atmospheric communication by means of the opening 14 and a separation element 5. In particular, the first chamber 4a and the second chamber 4b are defined in the main body 4 and are separated by the separation element 5.

With reference to FIGS. 6 and 7, this separation element 5 is a membrane 12 but may also be a piston 13.

The separation element 5 is movable along an axis X so as to define a movable separation wall 5a between the first chamber 4a and the second chamber 4b which is securely attached to the movable closure member 3 by means of a rod 31 in such a manner that the increase of the supply pressure of the gas, for example, following a reduction of the flow rate required downstream of the pressure regulator 1, brings about a movement of the movable separation wall 5a and consequently of the separation element 5, and accordingly a movement of the movable closure member 3 so as to reduce the passage section 2a. Accordingly, a reduction of the supply pressure of the gas brings about a movement of the movable separation wall 5a and consequently of the separation element 5, and accordingly a movement of the movable closure member 3 so as to increase the passage section 2a.

In this embodiment, the outflow pipe 2 for the passage of the gas develops between the inlet opening 21 and the outlet opening 22 through a through-channel 31c of the rod 31.

The first chamber 4a, which is also in this case the movement chamber, is located along the outflow pipe 2 itself, in particular downstream of the closure member 3.

The rod 31 has an external circular sealing ring in such a manner that the passage of the gas from the first zone 21a to the second zone 22a of the outflow pipe 2 is carried out only through the through-channel 31a.

Therefore, the gas enters the outflow pipe 2 of the pressure regulator 1 from the inlet opening 21, passes through the through-channel 31a, is introduced into the first chamber 4a and is finally discharged from the outlet opening 22.

The movable closure member 3 which is arranged along the outflow pipe 2 for opening and closing the outflow pipe 2 in a passage section 2a thereof, is positioned in this embodiment at an end of the through-channel 31c.

Also in this embodiment, when the movable closure member 3 varies the passage section 23a, it causes a variation of pressure of the gas from an adduction pressure, which is present in the first zone 21a of the outflow pipe 2 upstream of the movable closure member 3, to a supply pressure, which is present in the second zone 22a of the outflow pipe 2 downstream of the closure member 3.

Also this embodiment, the main body 4 further comprises a first magnetic element 6 which is arranged in the first chamber 4a, a second magnetic element 7 which is arranged in the second chamber 4b and a third magnetic element 8 which is interposed between the first magnetic element 6 and the second magnetic element 7.

The third magnetic element 8 is fixedly joined to the separation element 5 and to the movable closure member 3 to which it is connected by means of the rod 31.

The second magnetic element 7 has a through-channel 711 which is of cylindrical form and which develops along the axis X. The rod 31 has a length which is greater than the length of the through-channel 711 in such a manner that the separation element 5 and the movable closure member 3 are located along the axis X at opposite sides of the second magnetic element 7.

The rod 31 is slidingly received in this through-channel 711; the rod 31 is therefore able to slide in this through-channel 711 following the movement of the movable separation wall 5a.

The relative distance between the magnetic elements 6, 7, 8 along the axis X can also be regulated in this embodiment.

In particular, the position of the first magnetic element 6 along the axis X can be adjusted by means of a bush 10 which is positioned outside the first chamber 4a and the position of the third magnetic element 8 along the axis X can be regulated by varying the position along the axis X of the tablet-like sealing member 15.

This pressure regulator is also normally open, that is to say, the first magnetic element 6, placed in the first chamber 4a, magnetically attracts the third magnetic element 8, while the second magnetic element 7, placed in the second chamber 4b, magnetically repels the third magnetic element 8 in such a manner that, without any gas, the passage section 2a is not engaged by the movable closure member 3.

With respect to the embodiment of FIGS. 2-5, this embodiment has the advantage that the regulation of the pressure is not absolutely subjected to the adduction pressure, but instead only the supply pressure. While in fact, in the embodiments of FIGS. 2-5, the adduction pressure present in the first zone 21a of the pipe 2 acts partially directly on the movable closure member 3, forcing it to engage with the passage section 2a, in this embodiment this does not take place, the movable closure member 3 not being subjected in any manner to the adduction pressure, but instead only to the supply pressure of the gas through the movement chamber 4a.

Naturally, in order to comply with specific and contingent application requirements, a person skilled in the art may apply to the above-described invention additional modifications and variants which are still included within the scope of protection as defined by the appended claims.

The invention claimed is:

1. A pressure regulator for a gas comprising:
an outflow pipe for the gas;
a movable closure member for opening and closing the outflow pipe in a passage section thereof;
a main body comprising:
a first chamber in fluid communication with the outflow pipe,
a second chamber in atmospheric contact,
a separation element,
the first chamber and second chamber being defined in the main body and being separated by the separation element, the separation element being movable inside the main body so as to define a movable separation wall between the first chamber and the second chamber and being fixedly joined to the movable closure member,
characterized in that the main body further comprises:
a first magnetic element which is arranged in the first chamber,
a second magnetic element which is arranged in the second chamber, and a third magnetic element which is associated with the separation element, the third magnetic element having such a polarity as to be in a state of attraction with one of the first magnetic element and the second magnetic element and in a state of repulsion with the other of the first magnetic element and the second magnetic element.

2. The pressure regulator according to claim 1, wherein the magnetic elements have a magnetic axis which is arranged along an axis X.

3. The pressure regulator according to claim 2, wherein the third magnetic element is movable between the first magnetic element and the second magnetic element along the axis X.

4. The pressure regulator according to claim 2, wherein the movable closure member is capable of moving along the axis X for opening and closing the outflow pipe in the passage section thereof.

5. The pressure regulator according to claim 2, wherein the relative distance between the first magnetic element, the second magnetic element and the third magnetic element along the axis X is variable.

6. The pressure regulator according to claim 5, wherein the position of the third magnetic element along the axis X is variable.

7. The pressure regulator according to claim 5, wherein the relative distance between the magnetic elements is adjustable by means of regulator elements that comprise threaded connections.

8. The pressure regulator according to claim 2, wherein the position of at least one of the first magnetic element and the second magnetic element along the axis X is variable.

9. The pressure regulator according to claim 1, wherein one or more of the first magnetic element, second magnetic element and third magnetic element comprise one or more magnet(s).

10. The pressure regulator according to claim 9, wherein the one or more magnet(s) is/are permanent magnet(s).

11. The pressure regulator according to claim 9, wherein the magnets are arranged in each of the one or more magnetic elements symmetrically about the axis X.

12. The pressure regulator according to claim 9, wherein the magnets in each of the one or more magnetic elements have a polarity which is orientated in the same direction and parallel with the axis X.

13. The pressure regulator according to claim 1, wherein the separation element is a membrane or a piston.

14. The pressure regulator according to claim 1, wherein the arrangement and the polarity of the first magnetic element, second magnetic element and third magnetic element are such that the pressure regulator is normally open.

15. The regulation method for a pressure regulator according to claim 1, characterized by varying a calibration pressure and/or an overboost pressure and/or a cut-off pressure by varying a flux of the magnetic field intercepted by the third magnetic element.

16. The regulation method for a pressure regulator according to claim 15, characterized by varying the calibration pressure and/or the overboost pressure and/or the cut-off pressure by varying the relative distance between the first magnetic element, the second magnetic element and the third magnetic element and/or the magnetic force of one or more of the magnetic elements.

17. The regulation method for a pressure regulator according to claim 16, characterized by varying the calibration pressure and/or the overboost pressure and/or the cut-off pressure by varying the position of at least one of the first magnetic element and the second magnetic element and/or the third magnetic element.

* * * * *